US011042849B2

(12) United States Patent
Swami et al.

(10) Patent No.: US 11,042,849 B2
(45) Date of Patent: Jun. 22, 2021

(54) ADJUSTING TRANSACTION DISTRIBUTION BASED ON PREDICTED OPEN TRANSACTION EXECUTION RATES

(71) Applicant: 55 Global, Inc., New York, NY (US)

(72) Inventors: Ashu Swami, Freehold, NJ (US); Maodong Xu, Mill Neck, NJ (US)

(73) Assignee: APIFINY GROUP INC., New York, NY (US)

( * ) Notice: Subject to any disclaimer, the term of this patent is extended or adjusted under 35 U.S.C. 154(b) by 204 days.

(21) Appl. No.: 16/508,192

(22) Filed: Jul. 10, 2019

(65) Prior Publication Data

US 2020/0273003 A1    Aug. 27, 2020

Related U.S. Application Data

(60) Provisional application No. 62/810,909, filed on Feb. 26, 2019.

(51) Int. Cl.
| | |
|---|---|
| G06Q 20/08 | (2012.01) |
| G06Q 20/40 | (2012.01) |
| H04L 9/06 | (2006.01) |
| G06Q 20/36 | (2012.01) |
| G06Q 20/14 | (2012.01) |

(52) U.S. Cl.
CPC .......... *G06Q 20/0855* (2013.01); *G06Q 20/14* (2013.01); *G06Q 20/3672* (2013.01); *G06Q 20/405* (2013.01); *H04L 9/0637* (2013.01)

(58) Field of Classification Search
None
See application file for complete search history.

(56) References Cited

U.S. PATENT DOCUMENTS

| | | | | |
|---|---|---|---|---|
| 9,471,926 B2* | 10/2016 | Clyne | ............ | G07F 9/009 |
| 9,773,273 B2* | 9/2017 | Erez | ............ | G07F 17/40 |
| 10,255,996 B2* | 4/2019 | Ivanoff | ............ | G16H 50/20 |

(Continued)

FOREIGN PATENT DOCUMENTS

WO    WO 2014/089672 A1    6/2014

OTHER PUBLICATIONS

Lixia Cao, Research on Two Decision Models in Third-Party Payment Platform Transaction, : Sep. 6, 2019, Wireless Personal Communications (2020) pp. 141-151 (Year: 2020).*

*Primary Examiner* — Firmin Backer
(74) *Attorney, Agent, or Firm* — Lewis Roca Rothgerber Christie LLP

(57) ABSTRACT

A transaction processing system is configured to receive a transaction request to execute a transaction at one or more of a plurality of third party systems. The transaction processing system accesses an adjusted transaction record storing a plurality of open transactions received from the plurality of third party systems. The transaction processing system further divides the transaction request into one or more split transaction requests. The one or more split transactions requests are sent to a corresponding third party system for execution. The corresponding third party system executes the open transaction corresponding to each split transaction at the requested unit count of each split transaction. In response, the transaction processing system receives an execution report from one or more of the plurality of third party systems.

20 Claims, 8 Drawing Sheets

(56) References Cited

U.S. PATENT DOCUMENTS

| | | | | |
|---|---|---|---|---|
| 10,566,090 | B2* | 2/2020 | Ivanoff | G06Q 20/102 |
| 2011/0264501 | A1* | 10/2011 | Clyne | G06Q 30/02 |
| | | | | 705/14.25 |
| 2014/0289091 | A1 | 9/2014 | Srivastava et al. | |
| 2015/0193872 | A1* | 7/2015 | Ivanoff | G16H 50/20 |
| | | | | 705/38 |
| 2016/0103965 | A1* | 4/2016 | Ivanoff | G06Q 20/102 |
| | | | | 705/2 |
| 2016/0371692 | A1* | 12/2016 | Clyne | G06Q 30/0255 |
| 2020/0258630 | A1* | 8/2020 | Ivanoff | G06Q 20/14 |

* cited by examiner

1. Receive feed data from third party systems 310

Third Party System 312A

| Unit Count 314A | Value 316A |
|---|---|
| 1 | 3400 |
| 0.5 | 3401 |
| 2 | 3402 |
| 1.5 | 3405 |

Third Party System 312B

| Unit Count 314B | Value 316B |
|---|---|
| 0.5 | 3401 |
| 1 | 3402 |
| 1.5 | 3403 |
| 2 | 3404 |

Third Party System 312C

| Unit Count 314C | Value 316C |
|---|---|
| 0.5 | 3400 |
| 1 | 3402 |
| 1.5 | 3404 |
| 2 | 3405 |

2. Execute transaction of unit count 10 via multiple third party systems at lowest value amount 320

3. Receive execution response from third party systems 330

Third Party System Response 332A

Exec. Count: 1
Value: 3400

Exec Count: 1.2
Value: 3401

Exec Count: 0.5
Value: 3402

Third Party System Response 332B

Exec Count: 0.5
Value: 3401

Exec Count: 1
Value: 3403

Exec Count: 1
Value: 3404

Third Party System Response 332C

Exec Count: 0.5
Value: 3400

Exec Count: 1
Value: 3402

4. Compute actual scores 340

Actual Score = min(1, exec count/min(rep. count, req count)-1)

Actual Scores 342A

Value: 3400
Score = min(1, 1/1 - 1) = 0

Value: 3401
Score = 1

Value: 3402
Score = -0.75

Actual Scores 342B

Value: 3401
Score = 0

*Value: 3402*
*Score = -1*

Value: 3403
Score = -0.33

Value: 3404
Score = 0

Actual Scores 342C

Value: 3400
Score = 0

Value: 3402
Score = 0

*Value: 3404*
*Score = -1*

FIG. 3A

5. Store actual scores 350

| Target 351 | Timestamp 352 | Level 353 | Reported Unit Count 354 | Predicted Score 355 | Actual Score 356 |
|---|---|---|---|---|---|
| B | T0 | 0 | 1 | 0 | 0 |
| B | T0 | 1 | 0.5 | 0 | 1 |
| B | T0 | 2 | 2 | 0 | -0.75 |

6. Compute historical scores for each third party, target, and level 360

| Time Bucket 361 | Level 362 | Average Reported Unit Count 363 | Actual Score 364 |
|---|---|---|---|
| Prev hour | 0 | 0.91 | 0.7 |
| Prev day | 0 | 0.86 | 0.6 |
| Prev week | 0 | 0.88 | 0.2 |
| Prev month | 0 | 0.82 | -0.08 |

7. Model predicted scores (i.e., predict actual scores) for each third party, target, and level based on historical actual scores 370

Regression ([Predicted Score]) = b1 * [Prev_hour Actual Score] + b2 * [Prev_day Actual Score] + b3 * [Prev_week Actual Score] + b4 * [Prev_month Actual Score]

| Level 371 | Predicted Score 372 |
|---|---|
| 0 | 0 |
| 1 | 1 |
| 2 | -0.75 |
| 3 | 0 |

8. Modify reported unit counts with predicted scores 380

Adjusted Record 381 for Third Party System 312A

| Adjusted Unit Count 381 | Value 382 |
|---|---|
| 1 | 3400 |
| 1 | 3401 |
| 0.5 | 3402 |
| 1.5 | 3405 |

FIG. 3B

ADJUSTING TRANSACTION DISTRIBUTION BASED ON PREDICTED OPEN TRANSACTION EXECUTION RATES

CROSS-REFERENCE TO RELATED APPLICATION

The present application claims the benefit of U.S. Provisional Patent Application No. 62/810,909, filed on Feb. 26, 2019, which is hereby incorporated by reference in its entirety.

TECHNICAL FIELD

The disclosure generally relates to data prediction, and in particular to adjusting transaction distribution based on predicted open transaction execution rates.

BACKGROUND

In some networked systems, third party systems may each provide a list of open transactions that a processing system may request for execution. These third party systems may provide lists of such open transactions via one or more data feeds transmitted to the processing system. However, in some cases, some open transactions may not be exposed via the data feeds. If the processing system requests transactions for execution from these systems, the third party system may unexpectedly execute one of these unexposed open transactions. Furthermore, some of the open transactions presented in the data feeds may not be actual open transactions but may instead be programmatically generated based on other open transactions in the data feed, in order to modify the overall statistics of the open transactions in the data feeds provided by the third party system. Attempts to request execution of these programmatically generated open transactions would cause failure as they are not actual open transactions available for execution. Therefore, a processing system cannot properly execute transactions based on the reported transactions in the data feeds. Therefore, what is lacking is a method of requesting execution of transactions that can better match the actual open transactions available at the third party systems, resulting in a predicted result of execution that matches the actual result of the execution.

SUMMARY

Embodiments relate to a transaction processing system that is configured to receive a transaction request to execute a transaction at one or more of a plurality of third party systems, with the transaction request including a requested unit count.

The transaction processing system accesses an adjusted transaction record storing a plurality of open transactions received from the plurality of third party systems, with each of the plurality of open transactions storing an adjusted unit count of the open transactions.

The adjusted available transactions list is generated by computing the adjusted unit count for each of the plurality of open transactions of each third party system by modifying a reported unit count of each open transaction using a predicted score generated from a predictive model. The predictive model generates the predicted score based on an analysis of differences between reported unit counts of prior executed open transactions and executed unit counts of the executed open transactions.

The transaction processing system further divides the transaction request into one or more split transaction requests. Each split transaction request is associated with an open transaction of the plurality of open transactions in the adjusted transaction record, with a requested unit count of each split transaction not exceeding an adjusted unit count of the open transaction associated with each split transaction. Each split transaction request corresponds to one of the plurality of third party systems which provided the open transaction associated with each split transaction.

The one or more split transactions requests are sent to a corresponding third party system for execution. The corresponding third party system executes the open transaction corresponding to each split transaction at the requested unit count of each split transaction. In response, the transaction processing system receives an execution report from one or more of the plurality of third party systems indicating an executed unit count of the execution of the open transaction corresponding to each split transaction of the one or more split transactions.

BRIEF DESCRIPTION OF THE DRAWINGS

FIG. 3A is a block and flow diagram illustrating an example of generating the adjusted transaction record, in accordance with an embodiment.

FIG. 3B is a block and flow diagram continuing the example shown in FIG. 3A, in accordance with an embodiment.

The figures depict, and the detail description describes, various non-limiting embodiments for purposes of illustration only.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
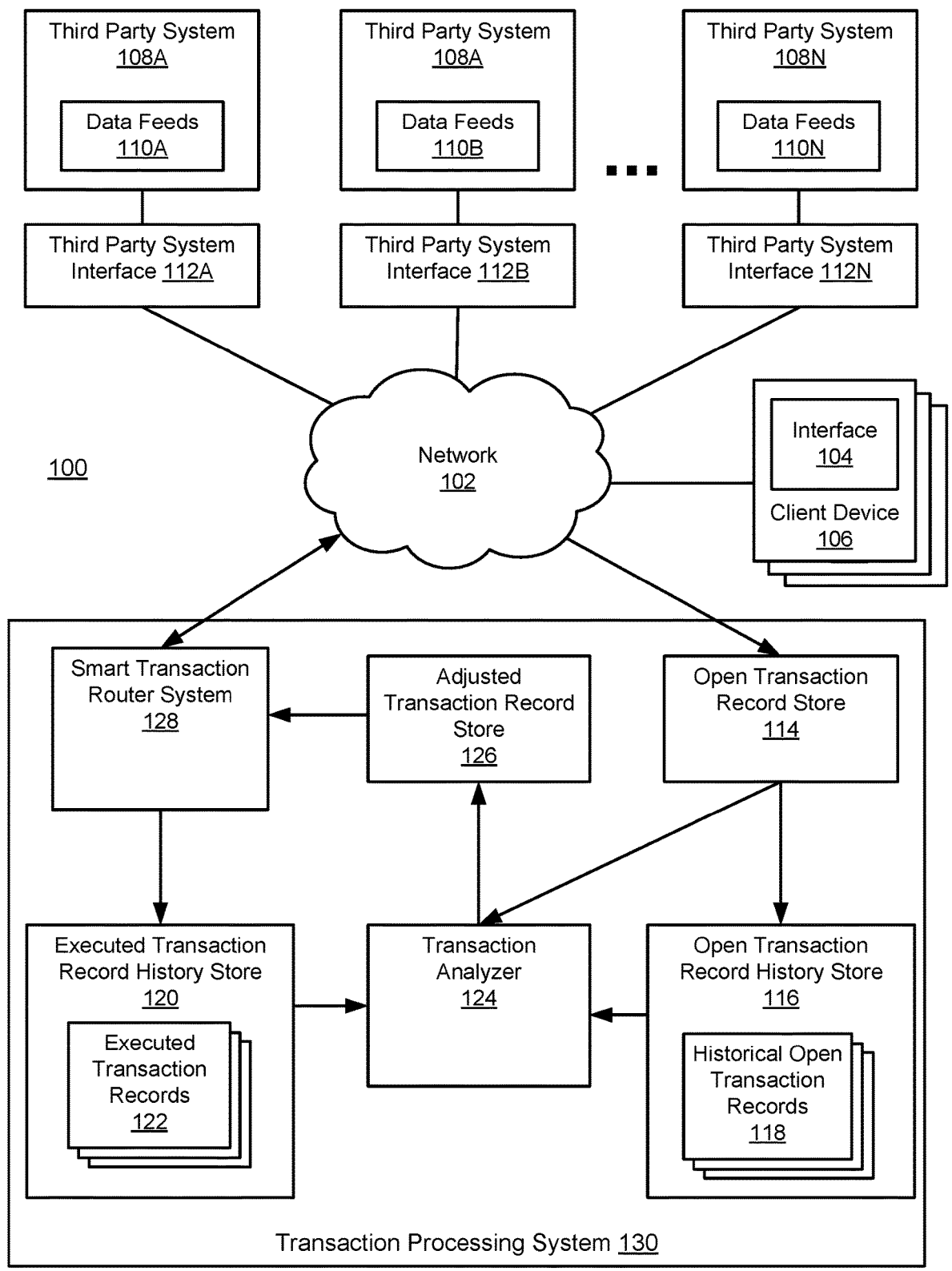
FIG. 1 illustrates an example system with a transaction analyzer to generate an adjusted transaction record for adjusting transaction distribution based on predicted open transaction execution rates, in accordance with an embodiment.

FIG. 1 illustrates an example system with a transaction analyzer 124 to generate an adjusted transaction record for adjusting transaction distribution based on predicted open transaction execution rates, in accordance with an embodiment. System 100 includes a network 102, one or more client devices 106 (referred to generally as client device/devices 106), one or more third party systems 108A-N (referred to generally as third party system/systems 108), each with a third party interface 112 (also referred to as third party interface 112A-N). The system 100 also includes the transaction processing system 130 with open transaction record store 114, open transaction record history store 116 storing historical open transaction records 118, an executed transaction record history store 120 storing executed transactions 122 generated by the smart transaction router system 128, and a transaction analyzer 124 to receive data from the various data stores to generate the adjusted transaction record store 126 for the smart transaction router system 128. In various embodiments, the system 100 may include different, fewer, or additional components. The components in the system 100 may each correspond to a separate and independent entity or may be controlled by the same entity.

The communications among the elements in the system 100 may be transmitted via the network 102, which may be, for example the Internet, a local area network, and so on. Some of the elements may communicate by one network, while other elements may communicate using a separate network. Each of these separate networks may be similar to the network 102. In one embodiment, the network 102 uses standard communications technologies and/or protocols. Thus, the network 102 can include links using technologies such as Ethernet, 702.11, direct microwave point to point connections, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 102 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 102 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the elements in the system 110 can use custom and/or dedicated data communications technologies instead of, or in addition to, the ones described above. For example, the network 102 may use a lean TCP/IP protocol that avoids a TCP/IP handshake penalty between elements to reduce communications latency.

The one or more client devices 106 are computing devices that may be operated by a user and be used by the user as a front-end device with which the user may be able to access data generated by the transaction processing system 130, and to submit requests to the transaction processing system 130. For example, the client devices 106 may be able to present to the user a list of open transactions, and to allow the user to submit requests to execute transactions. The client devices 106 may be any computing devices. Examples of client devices 106 include personal computers (PC), desktop computers, laptop computers, tablet computers, smartphone, wearable electronic devices such as smartwatches, or any other suitable electronic devices.

The client devices 106 may each include an interface 104, which may be provided by the transaction processing system 130 (e.g., the smart transaction router system 128) or by computer-readable instructions executed by the client device 106. The user may be able to access data or available at the transaction processing system 130 via the interface 104. In addition, the user may also be able to submit transaction requests via the interface 104. The interface 104 may take different forms. In one embodiment, the interface 104 is a component of a software application, which may be provided by the transaction processing system 130. For example, the software application may provide a front-end user interface that can be provided at the client device 106. The software application may be a package of computer-executable code that can be acquired (e.g., downloaded) and installed or executed at a client device 106. In another embodiment, the interface 104 may be an interface provided directly via the transaction processing system 130 or other server. For example, the interface 104 may be one or more web pages. The interface 104 may include a graphical user interface (GUI) that displays various information and graphical elements. In another embodiment, the interface 104 may not include graphical elements but may communicate with the transaction processing system 130 via other suitable ways such as application program interfaces (APIs).

The third party systems 108A-N each include one or more computing systems that each provide one or more data feeds 110A-N (referred to as data feed/feeds 131) to the transaction processing system 130, and in particular the open transaction record store 114. The data feed 110 includes continuously updated information regarding a particular data source or data sources. The data sources may contain information regarding some of the elements being described in the data feed 110, such as transactions (e.g., orders made in a financial market, purchase orders at a retail organization, logistics updates, shipping information), news (e.g., breaking news), predictions (e.g., weather reports), current statuses (e.g., status of equipment, public transportation, satellite positions), and so on. The data feed 110 may be provided using various data formats, such as CSV (comma separated value), XML (extensible markup language), and so on. The data feed may be provided using a custom format, such as with an expanded character set or the use of binary characters, and the data within may be encrypted prior to transmission.

The data feed 110, when provided, may be transmitted in one or more updates. Each update may occur as the data is generated, or may be generated periodically. For example, in the case of transactions, updates in the data feed 110 include data entries that describe new open transactions, modifications to existing open transactions, executed transactions, and so on. Each update may have information about the data feed 110 itself (e.g., an identifier or symbol indicating the type of data the data feed 110 is presenting), as well as information about the element being described. For example, in the case of transactions, the corresponding data feed entry may include information about the type of transaction, a value amount, timestamp of transaction, and so on. By receiving the data feed updates, a recipient computing device may be able to determine a current state of the elements being described in the data feed 110. For example, where the data feed 110 includes information about transactions, the receipt of the data feed 110 allows a system to determine a complete state of the transactions described by the data feed, i.e., to determine the current state of the market/exchange comprising these transactions.

Each third party system 108 may also optionally include a third party system interface 112 which allows computing systems external to the third party system 108 to access data, such as the data feeds 110, that are generated or stored at the third party system 108. The third party system interface 112 may present standardized data access methods to external systems, such as via the use of an application programming interface (API), or other known or well-defined process. These standardized data access methods may also allow external systems, such as the transaction processing system 130, to authenticate with the third party system 108. The standardized data access methods may adhere to REST (representational state transfer) constraints.

The transaction processing system 130 includes one or more computing systems that are configured to process the data received from the third party systems 108, provide this information to users (e.g., users of the client devices 106), and execute transactions requested by the users via the client devices 106. The transaction processing system 130 may include the open transaction record store 114, the open transaction record history store 116, the executed transaction record history store 120, the smart transaction router system 128, the transaction analyzer 124, and the adjusted transaction record store 126. However, in other embodiments, these components may be separate from transaction processing system 130 and may execute within separate computing systems, with these computing systems connected via the network 102 or via some other connection (e.g., a high speed interconnect).

The open transaction record store 114 processes the updates from the data feeds 110 of the third party systems 108 and stores these updates locally as an aggregated record which includes information from the multiple data feeds 110 of all third party systems 108 from which the open transaction record store 114 receives information. In particular, the open transaction record store 114 keeps a local version of the data feeds 110 based on the data entries received in the updates from the data feeds 110. These data entries may indicate new open transactions that have been created, modifications to existing open transactions, or open transactions that have been executed. Such an open transaction is a transaction that can be executed upon request by a user or other entity. Upon receiving the updates from the data feeds 110, the open transaction record store 114 updates a list of open transactions stored in the locally stored version of the data feeds 110 at the open transaction record store 114. The locally stored version of the data feeds 110 may be an aggregation of all data received from all data feeds 110, instead of data from just a single data feed 110. In one embodiment, this aggregated record stores all information from all data feeds 110 for a single target. This target is an indicator to which all data in that aggregated record is related to, and may be indicated in the updates received from the data feeds 110. For example, a target may be an identifier of a cryptocurrency.

Each entry in the aggregated record, which indicates an open transaction, further includes a value amount, a reported unit count, timestamp, and a transaction flow direction. The value amount indicates a value amount for the target for that open transaction data entry. The reported unit count indicates a number of units of the target at that value amount. The timestamp indicates a time at which the open transaction was received by the third party system 108 which provided the data feed 110 from which the information for the open transaction was received. The transaction flow direction indicates a direction of the flow of the transaction, whether ingress or egress. This may correspond to buy or sell, respectively. Thus, one entry in the aggregated record for a target "B" may indicate a value amount of "1000" with a reported unit count of "5," with a transaction flow direction of ingress. This may correspond to an open transaction available for execution to acquire 5 units of the target B at the value amount of 1000. In such a case, a user may request execution of this open transaction. Upon execution, the user may transfer 5 units of the item indicated by the target to a user who dispatched this particular open transaction to one of the third party systems 108. In exchange, the user receives a value amount of 5000 for this transaction. If the transaction flow direction is egress, then execution of the open transaction would instead cause the user to receive the 5 units of the target "B," at a value amount of 1000 each. The user would have to transfer a value amount of 5000 to the external user which submitted the open transaction.

The open transaction entries in the open transaction record store 114 may further be ordered based on one or more parameters. In one embodiment, the open transactions are ranked according to the value amount indicated in the open transaction. For open transactions with an egress transaction flow direction, the open transactions with the lowest value amount may be ranked first. For open transactions with ingress transaction flow directions, the open transactions with the highest value amount may be ranked first. If two open transactions have the same value amount, they may further be ranked according to timestamp, with the oldest timestamp open transactions being ranked highest.

In some cases, the open transaction record store 114 may receive a data entry from the data feeds 110 indicating a modification of an existing open transaction. In such a case, the open transaction record store 114 may modify the existing open transaction according to the instructions in the data feed entry. The modification may include modifications to any of the values in the open transaction stored in the open transaction record store 114, such as the value amount, reported unit count, and so on. The data entry received from the data feeds 110 may also indicate that a transaction is executed (i.e., filled). In such a case, the open transaction record store 114 may remove the open transaction entry from the aggregated record.

Thus, the open transaction record store 114 stores one or more aggregated records, with each record storing open transactions regarding a particular target, and with each aggregated record storing open transactions received from multiple data feeds 110 from multiple third party systems 108. The aggregated records of the open transaction record store 114 may be stored in a shared memory space that may be accessed by other components of the transaction processing system 130.

The open transaction record history store 116 stores historical versions of the open transaction record store 114. The open transaction record history store 116 may store new copies, i.e., new historical open transaction records 118, of the open transaction record store 114 for every change made to the open transaction record store 114. Alternatively, the open transaction record history store 116 may store new historical open transaction records 118, of the open transaction record store 114 periodically according to a schedule (e.g., once per second). In one embodiment, at least one historical open transaction record 118 is created every hour. The historical open transaction records 118 may be stored as differential copies, i.e., only the changes from the previous copy are stored with each new copy. The open transaction record history store 116 may be stored in a disk-based database. Each historical open transaction record 118 may have a unique identifier, timestamp, and other metadata, such as a transaction target of the copy, number of changes in the copy compared to the previous copy, and so on.

The executed transaction record history store 120 stores executed transaction records 122 which are transactions that have been requested to be executed by users, such as the users of the client devices 106. These executed transactions are open transactions listed in the open transaction record store 114 that have been requested for execution. The transaction may be directly requested by the user, or via a routing system, such as the smart transaction router system 128, which routes a request for a transaction from a user to multiple open transactions for execution. Once executed, the transaction indicated in the open transaction occurs, according to the parameters indicated in the open transaction (e.g., value amount, reported unit count, transaction flow direction, target) as noted above. The transaction may involve two entities, one of which may be the user of a client device 106, which connects to the transaction processing system 130.

Each executed transaction record 122 includes information regarding an open transaction which was executed, either by storing a copy of the open transaction or a reference to the open transaction, e.g., a reference to the open transaction stored in the open transaction record history store 116. In addition, the executed transaction record history store 120 stores, for each executed transaction record 122, an executed unit count. The executed unit count is the actual number of units that were executed in the transaction, and may differ from the reported unit count indicated in the open transaction. Each executed transaction record 122 also stores the requested unit count, which corresponds to the number of units that were requested when executing the open transaction. The requested unit count for an open transaction can be less than or equal to the reported unit count for that open transaction, and indicates a desired number of units for which a user or other entity wishes to transact from those available in the open transaction (as indicated by the reported unit count).

In one embodiment, a request to execute open transactions may be transmitted as a single aggregate request to a third party system 108, rather than targeting individual open transactions reported by the third party system 108 via its data feed 110. In this case, the single aggregate request may have various parameters, including an aggregate requested unit count (i.e., a total unit count requested for execution in the aggregate request), as well as a value amount (and transaction flow direction). The third party system may then execute this request by executing open transactions which match the request until the executed unit count for all the executed transactions matches the requested unit count in the request. Furthermore, the value amount of the open transactions that are executed should be greater than or less than the specified value amount in the request, depending upon whether the transaction flow direction is ingress or egress (e.g., buy or sell), respectively. In such a case, the executed transaction records 122 may store information about the open transactions that were executed, and also indicate the parameters of the single aggregate request that resulted in the executed transactions.

Although typically a request to execute an open transaction listed in the open transaction record store 114 is successful, in some instances the result of the execution may be unexpected. For example, in some cases, the executed transaction may be a transaction that was not listed in the open transaction record store 114. A request may be made for an open transaction to a third party system 108. However, the third party system 108 may actually execute a hidden open transaction which has a better value amount or an earlier timestamp, or other higher ranking, to the open transaction that was originally requested for execution. However, as this open transaction was hidden, it was not provided in a data feed 110 update to the open transaction record store 114. Therefore, no knowledge of this open transaction was available until it was actually executed. In this case, the executed transaction record 122 for this transaction would not have a reference to the corresponding open transaction in the open transaction record history store 116. This type of hidden open transaction may also be known as a hidden order.

In addition, in some cases, an open transaction that was selected for execution may not actually be executed by the corresponding third party system 108 which provided the data feed information for that open transaction, as it is not a real open transaction that has a party willing to offer the transaction. This type of open transaction may be reported in a data feed 110, and have data, such as a value amount, etc., that is programmatically or artificially generated. For example, the data within such an open transaction may be based on the other open transactions listed in that data feed 110 and available at the third party system 108. Once other open transactions at the third party system 108 are executed, the programmatically generated open transaction may change its data, and thus it may be an open transaction that may never actually be executed, as its data may be set such that it is never a highest ranked, i.e., most desirable, open transaction available at a third party system 108. However, it does change the apparent or perceived open transactions at the third party system 108. This type of open transaction may also be known as a pegged order.

As some of the listed open transactions received from the data feeds 110 are inaccurate, or as the data feeds 110 do not always show a complete picture of all the available open transactions at a third party system 108, a request for execution of any open transactions may result in an actual result that differs from the initial request. This is an unexpected result and is not desirable. These unexpected results may be more common with certain third party systems 108, such as those that transact in cryptocurrencies (i.e., currencies having ledgers recorded on a blockchain). Each third party system 108 may have a different number of hidden or programmatically generated open transactions, and thus, as shown below and with further detail in FIG. 2, the transaction analyzer may analyze the history of executed transaction records 122 and the historical open transaction records 118 to determine the likelihood of data feed 110 information from a third party system 108 having inaccurate information, and adjust the open transaction record store 114 to generate the adjusted transaction record store 126 which can more accurately reflect the actual open transactions that are available for execution at each third party system 108. The smart transaction router system 128 may use the adjusted transaction record store 126 to request execution of the adjusted open transactions indicated in the adjusted transaction record store 126. This results in executed transactions that have a higher likelihood of matching the open transactions listed in the adjusted transaction record store 126, reducing the chance of unexpected surprises or executing unwanted transactions when executing transactions.

The transaction analyzer 124 therefore generates the adjusted transaction record store 126 based on the executed transaction record history store 120 and the open transaction record history store 116. To do this, the transaction analyzer 124 analyzes one or more (recent) open transactions that were executed, by, for example, retrieving these transactions (i.e., the executed transaction records 122) from the executed transaction record history store 120. The transaction analyzer 124 may include multiple process threads, each tasked to analyze executed transactions for a single transaction target. From these executed transactions, the transaction analyzer 124 determines how many of them were executed such that the executed unit count matches the requested unit count for that corresponding open transaction. As noted above, the requested unit count is the number of units requested for that open transaction, and is less than or equal to the reported unit count for that open transaction, while the executed unit count is the actual number of units that were transacted when the open transaction was requested for execution with the requested unit count. An actual score is generated for each of these executed transactions indicating whether the executed unit count matches the executed unit count. In one embodiment, the actual score is 0 if the executed unit count matches the requested unit count, the actual score is greater than or equal than −1 and less than 0 if the executed unit count is less than the requested unit count, and the actual score is less than or equal to 1 and greater than 0 if the executed unit count is greater than the requested unit count. These actual scores may be stored in the open transaction record history store 116 or in a separate database.

After analyzing one or more recent executed transactions and generating an actual score for each executed transaction, the transaction analyzer 124 samples actual scores from executed transactions for each individual third party system 108 within multiple buckets. Each bucket groups transactions having execution timestamps within a specific recency (e.g., previous hour, previous day, etc.). This data is used as feature input for a predictive model, such as a regression model, to generate one or more predicted scores that predicts the likely value of the actual score for future executed transactions at the same third party system 108 (and in some cases, for the same target). In other words, the predicted score predicts the likelihood that an open transaction, if executed, would have an executed unit count exceed, be equal to, or be less than the reported unit count (or requested unit count). Using these predicted scores, the transaction analyzer 124 modifies the open transaction record score 114, using for example, a multiplicative product, to generate the adjusted transaction record store 126. Specifically, the transaction analyzer 124 modifies/adjusts the reported unit counts for the open transactions indicated in the open transaction record store 114 according to the generated predicted scores. These adjusted unit counts for an open transaction may more accurately reflect what the maximum executed unit counts would likely be if a request were made for that open transaction. The adjusted unit count may be less than or greater than the reported unit count for the open transaction. However, by being closer to the actual executed unit count, the adjusted unit count is a more accurate predictor of the result of any request to execute any open transaction at a third party system, and helps to avoid issues regarding programmatically generated open transactions and hidden open transactions as noted above.

The adjusted transaction record store 126, as noted above, stores adjusted open transactions that have adjusted unit counts which are modified by the transaction analyzer 124 from the original reported unit counts for the corresponding open transaction. The adjusted transaction record store 126 may be stored in memory that is shared with the transaction analyzer 124, to allow for low latency access by the transaction analyzer 124. Each update from the transaction analyzer 124 of a new set of adjusted unit counts for new open transactions received by the open transaction record store 114 may be assigned a unique identifier, which may be stored alongside the update, and may also be referenced using a hash table or other index. These updates may be updated via a single process/thread, to avoid issues which may be caused by race conditions due to multiple threads. Therefore, any updates from the transaction analyzer 124 may be placed in a single queue for serial processing. The format, ranking, and other features of the adjusted transaction record store 126 may be similar to the open transaction record store 114.

The smart transaction router system 128 routes any requests to execute open transactions listed at the open transaction record store 114 or the adjusted transaction record store 126 to the third party systems 108 such that the open transactions that are selected for execution are optimally selected and distributed amongst the various third party systems 108.

As noted above, the transaction analyzer 124 modifies the open transaction record store 114 to generate the adjusted transaction record store. A requesting entity, such as a user (via the client device 106), separate computing device, or executable program, may be able to directly select adjusted open transactions listed in the adjusted transaction record store 128 and request execution for these. In such a case, the smart transaction router system 128 may transmit the request as indicated by the requesting entity to the third party system 108 corresponding to the selected adjusted open transactions and have the third party system 108 execute the selected transaction. The requesting entity may indicate a requested unit count that differs from the adjusted unit count of the adjusted open transactions that are selected.

Alternatively, the requesting entity may instead transmit an aggregate request to the smart transaction router system 128. Similar to an aggregate request made to a third party system, the aggregate request may include an aggregate unit count, transaction flow direction, and optionally a value amount, as well as the transaction target. However, the aggregate request to the smart transaction router system 128 may target more than one third party system 108. The smart transaction router system 128, upon receiving this aggregate request, accesses the adjusted transaction record store 126 and identifies the adjusted open transaction entries corresponding to the transaction target and the indicated transaction flow direction. These adjusted open transaction entries, similar to the open transaction entries in the open transaction record store 114, are ranked in accordance with their indicated value amount and their timestamp, as described above with reference to the open transaction record store 114. The smart transaction router system 128 selects those adjusted open transaction entries that are ranked highest, such that the sum of the adjusted unit counts indicated in the selected adjusted open transaction entries meets or exceeds the requested aggregate unit count of the aggregate request. The smart transaction router system 128 may also determine that the value amount indicated in these adjusted open transaction entries does not exceed the threshold set by the value amount (i.e., greater than or equal to the value amount for an ingress transaction flow direction, and less than or equal to for an egress transaction flow direction). The open transactions selected by the smart transaction router system 128 may otherwise be known as split transactions, as they are split from the aggregate request.

The smart transaction router system 128 transmits requests to the third party systems 108 that correspond to the selected adjusted open transaction entries (i.e., the split transactions). These are third party systems 108 that provided information in the data feeds 110 about open transactions which were adjusted to generate the selected adjusted open transaction entries. The smart transaction router system 128 submits requests to execute the open transactions corresponding to the selected adjusted open transaction entries. The request associated with each open transaction includes a requested unit count that matches the adjusted unit count generated for that open transaction by the transaction analyzer 124. If the aggregate unit count is less than the sum of the adjusted unit counts of the selected adjusted open transaction entries, the smart transaction router system 128 may reduce the requested unit count of the lowest ranked adjusted open transaction entry in the selected adjusted open transaction entries such that the requested unit count for this lowest ranked entry equals a remaining number of unit counts after subtracting the adjusted unit counts of all the other selected adjusted open transaction entries from the aggregate unit count. Such a method allows the smart transaction router system 128 to select those open transactions with the highest ranking, and thus, the best value amount (which, as noted, differ depending upon the transaction flow direction). Thus, the smart transaction router system 128 selects the best distribution of requests to make when multiple third party systems 108 provide information about open transactions, in order to achieve the most optimal selection based on value amount for the user.

After submitting requests to execute open transactions, the smart transaction router system 128 receives a response from the third party systems 108 with the results of the request, such as an execution report or log. The response from the third party systems 108 indicate, for each requested execution of an open transaction, the executed unit count for the executed transaction, i.e., how many units of the transaction target were actually processed in the transaction. The smart transaction router system 128 may also receive, for each executed transaction, an identifier for that transaction, a value amount, the transaction flow direction, and other information. The smart transaction router system 128 stores these results and other metadata for each executed transaction in the executed transaction record history store 120 as the executed transaction records 122. These may be used, as described above, by the transaction analyzer 124 to generate updates for the adjusted transaction record store 126. The transaction analyzer 124 may generate an update to the adjusted transaction record store 126 each time the smart transaction router system 128 stores a new executed transaction in the executed transaction record history store 120.

In one embodiment, the smart transaction router system 128 may further limit the third party systems 108 that are selected for execution of transactions based on geographical distance to the smart transaction router system 128, as an additional latency to geographically more distance third party systems 108 may cause race conditions with other entities wishing to execute open transactions available at the third party system 108.

The smart transaction router system 128 may be a single threaded process, which allows it to avoid race conditions when requesting execution of open transactions, in order to ensure that different requests are processed sequentially.

The system 100 may also optionally include one or more blockchains (not shown) which can be accessed by elements on the network 102 to record the executed transactions on the blockchain. For example, the data feeds 110 may include data about exchange rates between various cryptocurrencies which have transaction ledgers recorded on various blockchains. The client device 106, by accessing the transaction processing system 130 to request execution of open transactions, may be able to see information regarding all the data feeds 110, and thus the exchange rates of these cryptocurrencies. Subsequently a user may be able to use the client device 106 to request execution of these open transactions to exchange these various cryptocurrencies. Upon completion of a transaction, the third party system 108, transaction processing system 130, or some other entity may submit transactions to the corresponding blockchains to effect the completion of the transaction by recording them to the respective blockchain ledgers. The blockchains may be public blockchains. A public blockchain network may include a plurality of nodes that cooperate to verify transactions and generate new blocks (which may record transaction information regarding cryptocurrencies). In some implementations of a blockchain, the generation of a new block may also be referred to as a mining process. The blockchains may support smart contracts, which are set of code instructions that are executable when one or more conditions are met. When triggered, the set of code instructions may be executed by a computer such as a virtual machine of the blockchain. Here, a computer may be a single operation unit in a conventional sense (e.g., a single personal computer) or may be a set of distributed computing devices that cooperate to execute the code instructions (e.g., a virtual machine or a distributed computing system). Examples of such public blockchain platforms include BITCOIN, ETHEREUM, EOS, NEO, CARDANO, STELLER, etc. Additional details regarding the properties of the blockchain are described below with reference to FIGS. 6A-6B.

Example Transaction Analyzer

Figure 2:
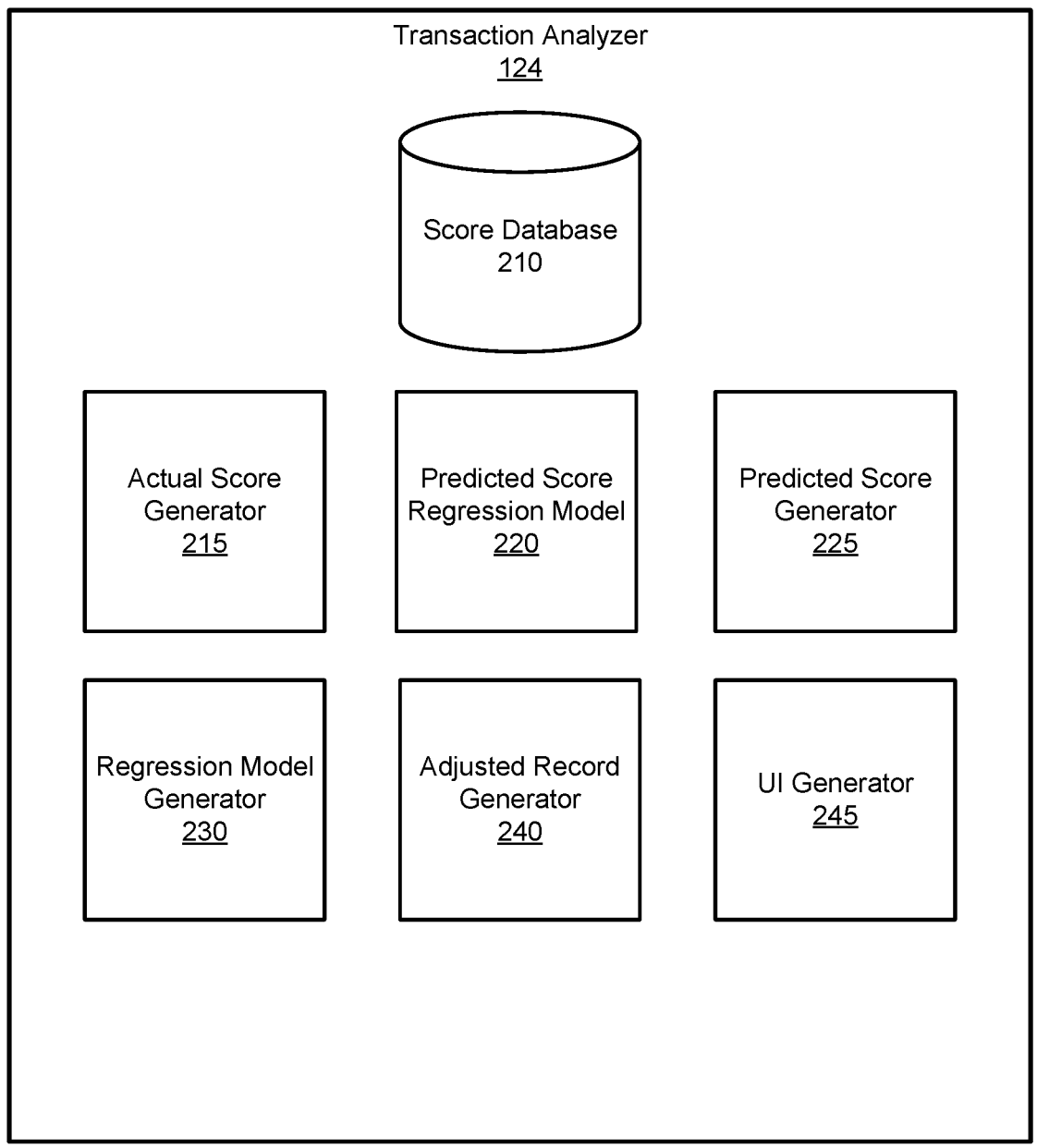
FIG. 2 is a block diagram illustrating the components of the transaction analyzer of FIG. 1, in accordance with an embodiment.

FIG. 2 is a block diagram illustrating the components of the transaction analyzer 124 of FIG. 1, in accordance with an embodiment. In the embodiment shown in FIG. 2, the transaction analyzer 124 includes (optionally) a score database 210, an actual score generator 215, a predicted score regression model 220, a predicted score generator 225, a regression model generator 230, an adjusted record generator 240, and a user interface (UI) generator 245. The functions of the transaction analyzer 124 may be distributed among different components in a different manner than described. Also, in various embodiments, the transaction analyzer 124 may include, different, fewer, and/or additional components. Additional details, including an example execution of the process of generating the adjusted record transaction store, are described further below with reference to FIGS. 3A-3B.

In one embodiment, the score database 210 stores scores generated by the actual score generator 215 during the process of generating the adjusted open transactions of the adjusted transaction record store 126. The score database 210 also stores the predicted scores generated by the predicted score generator 225 that are used to modify the reported unit counts of the open transactions in the open transaction record store 114. The score database 210 may also store other metadata and information necessary to generate the adjusted open transactions, such as timestamps, transaction target information, a level (i.e., ranking) of an open transaction for a third party system, and so on. Each entry in the score database 210 may be indexed by a unique identifier to allow for fast retrieval. Furthermore, the entries may be indexed according to the recency of their timestamps, with entries indexed into various ranges of recency, e.g., the past hour, day, week, and month, such that the actual scores and other data may be easily sampled from a particular range of recency. For example, actual scores computed for executed transactions in the past hour may be assigned a particular index value, while those that are within the past day may be assigned another index value. An actual score may be sampled from one of these recency range simply by referencing the specific index value for that recency range. In one embodiment, the scores database 210 may be stored in the open transaction record history store 116, with the actual scores that are computed stored with reference to the open transactions from which they were computed.

The actual score generator 215 generates actual scores from executed transactions accessed from the executed transaction record history store 120. After the smart transaction router system 128 transmits a set of open transactions to be executed to their respective third party systems 108, the third party system subsequently respond with a report or other response indicating the executed unit count after executing that open transaction. As noted above, in some cases, due to the open transactions reported by a third party system 108 not matching the actual available open transactions at the third party system 108, the executed unit count may differ from the requested unit count. The actual score generator 215 generates an actual score for each of these executed transactions to quantify the differences between the executed unit count and the requested unit count for a transaction, such that future transactions with the third party system 108 can more accurately anticipate the actual executed unit counts.

In one embodiment, for each executed transaction, the actual score generator 215 computes the actual score as:

[actual score]=min(1,[executed count]/min([reported count],[requested count]−1)

Here, the [executed count] is the actual executed unit count (of units of the target) for the executed transaction. The [reported count] is the reported unit count in the corresponding open transaction data received from the data feeds 110 and stored in the open transaction record store 114. The [requested count] is the requested unit count requested by the smart transaction router system 128 when requesting execution of the open transaction. The function min([ ],[ ]) outputs the minimum of the two values that are input into the function. The result of equation (1) is to generate a score that is 1) greater than or equal to −1 and less than 0 if the executed unit count is less than the requested unit count, 2) equal to 0 if the executed unit count is equal to the requested unit count, and 3) greater than 0 and less than or equal to 1 if the executed unit count exceeds the requested unit count.

As noted above, although in some cases the smart transaction router system 128 may select individual open transactions for execution at a third party system 108, in some cases an aggregate request may be made to a third party system. In such a case, the [requested count] is not the aggregate unit count, but rather a computed requested count based on dividing the aggregate unit count amongst the highest ranked open transactions listed in the adjusted transaction record store 126 (or the open transaction record store 114) for the third party system. To divide the aggregate unit count, the actual score generator 215 adds the adjusted reported unit counts of the open transactions, starting by selecting the highest ranked open transaction, and continuing sequentially by selecting lower ranked open transactions, until the sum of the adjusted reported unit counts of the selected open transactions matches or exceeds the aggregate unit count. The actual score generator 215 sets the requested count for each of these open transactions to the adjusted reported unit count for the open transaction. For the last and lowest ranked open transaction in the selected open transactions, the actual score generator 215 sets the requested count to the value of the aggregate unit count subtracted by the sum of the adjusted reported unit counts of the selected open transactions excluding this last open transaction. The expectation is that the third party system 108 will execute the aggregate request by executing the open transactions corresponding to those in selected list.

In some cases, a third party system 108 may not actually execute an open transaction submitted by the smart transaction router system 128 because that open transaction does not actually exist (e.g., it is programmatically created or was requested for execution by someone else). In such a case the executed unit count for that open transaction is set to zero.

In some other cases, the third party system 108 may execute a request for an open transaction by executing a hidden open transaction that was not shown to the transaction processing system 130. This hidden open transaction, if it has the same value number as one of the open transactions for which execution was requested, is merged with that open transaction when computing the executed unit count. While the reported unit count and requested unit count do not change, the executed unit count will include the executed unit count of the non-hidden open transaction, summed with the executed unit count of the hidden open transaction. If the value amount of the hidden open transaction differs from the value amount of any of the open transactions indicated in the adjusted transaction record store 126, the actual score generator 215 may merge the executed unit count of hidden open transaction that is executed with the executed unit count of an open transaction with a value amount that is immediately lower ranked than the value amount of the hidden open transaction that was executed. Thus, for example, if the value amount of the hidden open transaction that was executed was 3400.5, and the executed unit count for this hidden open transaction is 1.2, then it would be combined with the executed unit count of the open transaction with the next lower ranked value amount, which may be 3401 in this example (for an egress transaction flow direction).

After computing the actual score for an executed transaction, the actual score generator 215 stores the computed actual score in the score database 210. Additional information, such as the transaction target, value amount, transaction flow direction, identifier, timestamp, and other details may be stored by the actual score generator 215 alongside the computed actual score. The actual score generator 215 also stores the level (i.e., "rung") of the executed transaction, which indicates the ranking, by value amount, of the executed transaction for that third party system (e.g., level 0 would be the highest ranked, level 1 being the next highest ranked, and so on). Executed open transactions, or open transactions, of the same value amount but different timestamps are assigned the same level. The actual score generator 215 may also compute an index for that computed actual score based on its recency or timestamp so that future retrieval based on timestamp can occur quickly. Although the actual score generator 215 may generate the actual scores for executed open transactions as they are executed, in other embodiments, the actual score generator 215 may generate the actual scores for executed open transactions offline, periodically, in batch, or according to another timeframe. In such a case, the actual score generator 215 may retrieve the reported unit counts and other relevant data for older open transactions from the open transaction record history store 116 in order to generate the actual scores for these transactions.

The predicted score regression model 220 is a model that is used to generate one or more predicted scores based on the actual scores computed by the actual score generator 215. Although described as a regression model here, the predicted score regression model 220 may be any type of predictive model or algorithm. The predicted score that is generated by the predicted score regression model 220 is a prediction of what the actual score for an open transaction would be if that that open transaction were executed, based on an analysis of previously gathered actual scores. Therefore, the input to the predicted score regression model 220 includes previously gathered actual scores, and the output is a predicted score indicating a likely value for the actual score for an open transaction. In one embodiment, the predicted score regression model 220 generates a predicted score not for each open transaction, but for each level of open transactions for each third party system's open transactions, as indicated by the data feed 110 for that third party system 108.

In one embodiment, the inputs into the predicted score regression model 220 include actual scores sampled from executed transactions that are a certain level and which are from a single third party system 108. These sampled actual scores are sampled from buckets that have actual scores generated from open transactions from various ranges of recency, such as the past hour, past day, past week, and past month.

The predicted score generator 225 samples the actual scores from the different buckets of actual scores of different ranges of recency and generates the predicted scores for each level for each third party system using the predicted score regression model 220. One or more actual scores may be sampled from each of these buckets, and the sampled actual scores from each bucket may be combined using some function by the predicted score generator 225. For example, one actual score may be sampled per hour from each of these buckets, and the actual scores sampled for each bucket may be combined using an average function. After generating a single combined actual score for each bucket, the predicted score generator 225 feeds these inputs into the predicted score regression model 220 to generate the predicted score for the corresponding level of open transactions for the third party system 108. The predicted score generator 225 repeats this for the different levels at each third party system for each transaction target, as well as for different third party systems. Different predicted values may also be generated for each type of transaction flow direction. The predicted score generator 225 may also updated this predicted score periodically over time (e.g., as soon as time equal to the range of time of the bucket with the smallest range of time passes). After generating the predicted scores, the predicted score generator 225 sends these predicted scores to the adjusted record generator 240 to generate the adjusted transaction record store 126. Initially, if no actual scores, or insufficient actual scores, are available to input into the model, the predicted score generator 225 may generate a predicted score of zero.

The regression model generator 230 generates the predicted score regression model. In one embodiment, the predicted score regression model 220 is generated by regressing the actual score on the historical actual scores. For example, the regression equation could be:

$$S_P = c + b_1[\text{Prev\_hour}S_A] + b_2[\text{Prev\_day}S_A] + b_3[\text{Prev\_week}S_A] + b_4[\text{Prev\_month}S_A] \quad (2)$$

Here, $S_P$ is the predicted score, and $S_A$ is the actual score that is sampled from the indicated bucket. For example, Pre_hour indicates a bucket of actual scores of the previous hour, and Pre_day indicates a bucket of actual scores for the previous day. As noted, the actual scores sampled in each bucket may be an average of multiple sampled actual scores sampled at a particular interval. The regression model generator 230 use an actual score for an executed transaction, and then select buckets of recency based on the timestamp of that executed transaction. The regression model generator 230 samples the actual scores with corresponding timestamps that are within the ranges specified in these buckets. Using multiple samples, the regression model generator 230 then trains the regression model to generate the regression model coefficients $b_1$, $b_2$, $b_3$, $b_4$, and so on.

In one embodiment, additional independent variables may be used to train the model, such as average volume and average volatility of the transaction target throughout all executed transactions. These may be computed as well for each bucket (e.g., by the predicted score generator 225), and used as input in the model. These additional independent variables may also be stored in the score database 210.

In another embodiment, other modeling techniques may be used with these input and output variables, such as principle component analysis, neural networks, and so on.

The adjusted record generator 240 modifies the open transaction record store 114 using the predicted scores for each level of open transactions for each third party system 108. In one embodiment, the adjusted record generator 240 takes a predicted score generated for a particular level, transaction target, transaction flow direction, and third party system, and modifies the corresponding reported unit count of the open transactions that have the same level, transaction target, transaction flow direction, and are from the same third party system, by the predicted score, in order to generate the adjusted unit count. In one embodiment the modification is: [reported unit count] *(1+[predicted score]). Therefore, if the predicted score is 0, and the reported unit count is 5, then the adjusted unit count is 5. When the predicted score is less than zero, then the adjusted unit count will be lower than the reported unit count. Alternatively, if the predicted score is greater than zero, the adjusted unit count is greater than the reported unit count. Thus, the adjusted unit count is adjusted proportionally based on how likely the executed unit count will be greater, less, or the same as the requested unit count. An example of this process described below with reference to FIGS. 3A-3B.

The UI generator 245 generates a graphical user interface, e.g., interface 104, that presents the information in the to a user, e.g., a user of the client device 106, regarding the data received from the third party systems 108, e.g., the open transaction record store 114, as well as the modified adjusted transaction record store 126 that is generated by the transaction analyzer 124. The UI generator 245 may present the highest ranked values from the adjusted transaction record store 126 (or the open transaction record store 114) for each transaction target and transaction flow direction, aggregating the open transactions for each transaction target and flow direction from all third party systems 108 into a single list.

The UI generator 245 may update the user interface in real time as new data is updated from the third party systems 108 and as new adjusted unit counts are generated. In one embodiment, the UI generator 245 is executed on the client device 106 instead of at the transaction processing system 130.

Example Process for Local Version Update from Remote Data Feed

FIG. 3A is a block and flow diagram illustrating an example of generating the adjusted transaction record, in accordance with an embodiment. The operations in the illustrated example may be performed by the transaction processing system 130. However, in other embodiments the operations may be performed by other components, such as the client device 106.

At (1), the transaction processing system 130 receives 310 the feed data from the data feeds 110 of the third party systems 108. In the illustrated example, three third party systems 312A-C are shown. The data feed from each third party system 312 includes information about a transaction target, including a reported unit count 314 (specifically unit count 314A-C) and a value amount 316 (specifically value amount 316A-C). As noted, these indicate a reported unit count and accompanying value amount for an open transaction. Thus, each row in the illustrated feed is an open transaction available for execution.

At (2), a request to execute an aggregate transaction with an aggregate unit count of 10 is made to the transaction processing system 130. The transaction processing system 130 executes 320 the requested transaction at the multiple third party systems 312, e.g., via the smart transaction router system 128. As noted above, the smart transaction router system 128 executes the aggregate request by dividing the request amongst the various third party systems 312 ranked by value amount. This results in various requests to execute transactions being transmitted to the third party systems 312A-C. Here, these may include, 1) for third party system 312A: 1 unit at value 3400, 0.5 units at value 3401, and 2 units at value 3402; 2) for third party system 312B: 0.5 units at value 3401, 1 unit at value 3402, 1.5 unit at value 3403, and 1 unit at value 3404; 3) for third party system 312C: 0.5 units at value 3400, 1 unit at value 3402, and 1.5 units at value 3404.

After submitting the request to execute the open transactions as indicated, the transaction processing system 130 receives 330 one or more responses from the third party systems 312A-C indicating the result of the execution, e.g., in an execution report. The execution report may be presented in the third party system responses 332A-C. Here, due to some open transactions listed at the third party systems 312A-C being hidden or being programmatically generated, some of the open transactions that were requested are not executed, or are not executed with the same executed unit count as the requested unit count for that transaction. For example, third party system 312B only reports execution of three open transactions, while four requests were made to the third party system 312B to execute four open transactions. This may be due to one of the requests for execution of an open transaction being a request for a programmatically generated open transaction which changed its value after the execution of one of the other open transactions. The change in value caused it to no longer match the originally requested open transaction, and thus was not executed.

The transaction processing system 130 takes the execution response from the third party systems and at (4) computes 340 the actual scores 342A-C based on the differences between the executed unit counts, reported unit counts, and requested unit counts. In the illustrated example, the transaction processing system 130 uses the equation (1) from above. This results in the generation of various actual scores. Note that certain requests for open transactions were not executed. In these cases, the executed unit count is zero for the purposes of computing the actual score for these transactions. The computations for these non-executed open transactions are indicated in italics. The actual scores 342B for the third party system 312A has one of these, while the actual scores 342C for the third party system 312C has two of these.

FIG. 3B is a block and flow diagram continuing the example shown in FIG. 3A, in accordance with an embodiment.

Referring now to FIG. 3B, at (5), the transaction processing system 130 may store 350 the actual scores that are generated, e.g., in the scores database 210, or the open transaction record history store 116. As illustrated, these may include, for each third party system, an entry indicating an actual score 356 generated for a target 351 at a particular timestamp 352, for a value amount at a particular level 353. Also stored in the entry is the reported unit count 354 of the original open transaction, as well as any previously predicted score 355 (which may be set to zero if no score has yet been predicted). The generation of the predicted score is further detailed below.

After generating a number of actual scores, at (6), the transaction processing system 130 computes 360 historical scores from the generated actual scores. These may be divided into scores collected over various time buckets 361 that indicate recent periods of time, such as the previous hour, day, week, or month. The actual scores 364 for each level 362 and transaction target for a third party system may be sampled from within the time periods indicated for each bucket and averaged, and stored as the actual score 364 in the illustrated table, along with the averaged reported unit count 363, which is an average of the reported unit count (which may also be sampled) from the corresponding time period.

As shown, the historical scores here are for a single level (e.g., level 0), a single transaction target, and for a single third party system. However, in practice, multiple historical scores would be stored for different levels, targets, and third party systems. A new set of historical scores may be generated each time a set of actual scores is generated, or the historical scores may be generated periodically. The historical scores may be stored in the scores database 210 or the open transaction record history store 116.

At (7), the historical scores are used to model 370 a predicted score. This may occur according to the process described above with reference to the regression model generator 230. Here, for each level 371 of a third party system's open transactions, a predicted score 372 is generated. This score, as noted above, indicates likelihood of deviation of an executed unit count from the reported or requested unit counts. For example, in the illustrated example, the predicted score for level 0 is 0. This indicates that the executed unit counts for open transactions for this target and third party system at level zero are likely not to differ from the reported unit counts. However, at level 1, the predicted score is 1, indicating that the executed unit count may likely exceed the reported unit count.

After modeling the predicted scores, at (8), the transaction processing system 130 may use the predicted scores to modify 380 the reported unit counts of the open transactions reported by a third party system. In the illustrated example, the reported unit counts for third party system 312A are modified by the predicted scores (e.g., by multiplying the reported unit count with 1+predicted score) to generate the adjusted unit counts 381 for each level (where each level indicates a different ranked value amount 382), as indicated in the adjusted record 381. This is subsequently used in order to request the execution of open transactions, e.g., by the smart transaction router system 128, to the various third party systems.

Example Interaction Diagram

Figure 4:
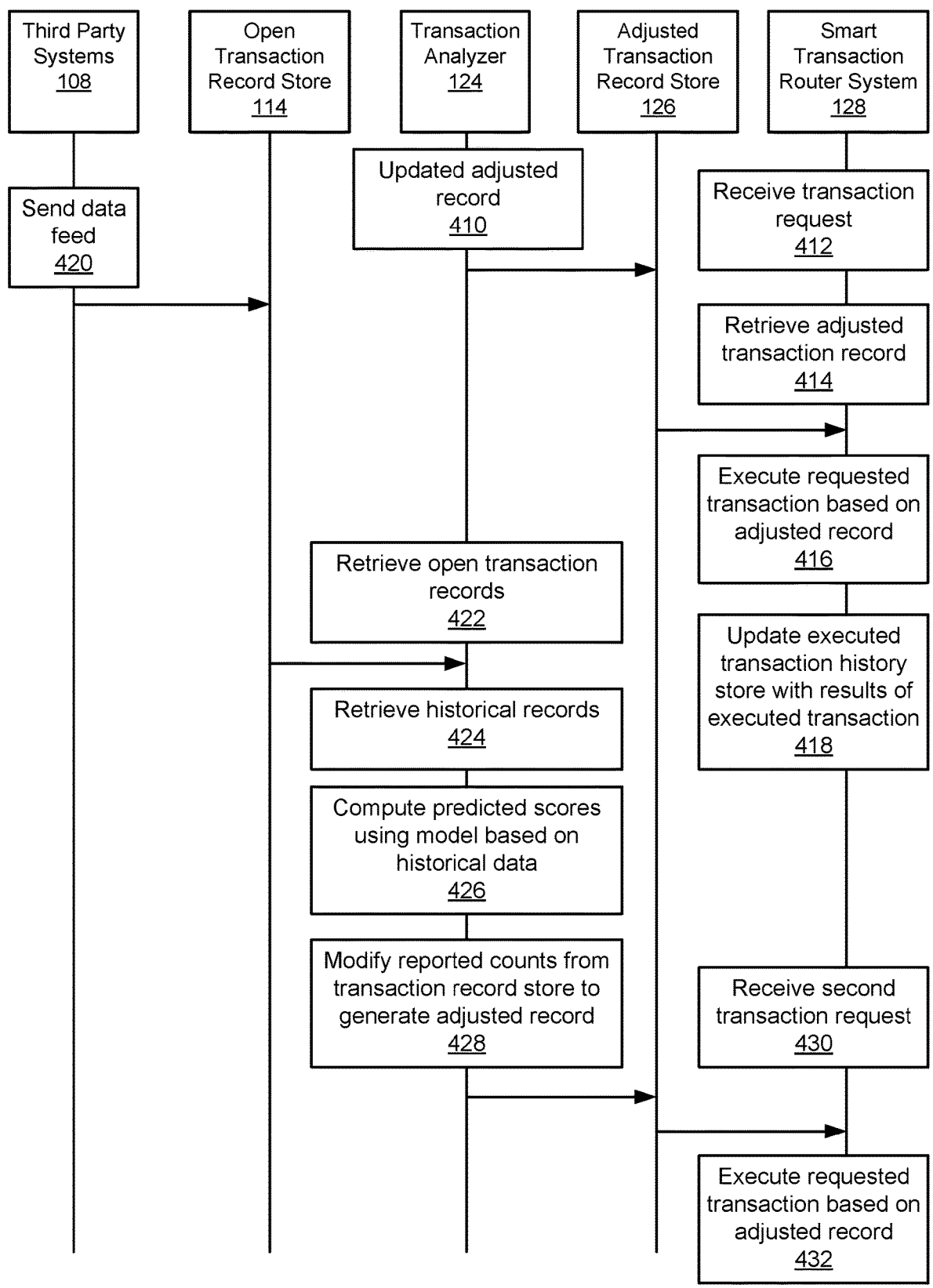
FIG. 4 is an interaction diagram describing an example process of the components in FIG. 1 for adjusting transaction distribution based on predicted open transaction execution rates, in accordance with an embodiment.

FIG. 4 is an interaction diagram describing an example process of the components in FIG. 1 for adjusting transaction distribution based on predicted open transaction execution rates, in accordance with an embodiment. Although certain operations are associated with certain elements as shown, in other embodiments, different elements may perform different operations.

Initially, the transaction analyzer 124 may update 410 the adjusted transaction record store 126. As noted above, this allows the reported unit counts for open transactions to be modified to adjusted unit counts, which may be a more accurate representation of the actual unit counts of the open transactions at the third party systems 108.

The smart transaction router system 128 also receives 412 a transaction request to execute one or more open transactions from the third party systems 108. This may be a request received from an authorized client device. To execute these transactions, the smart transaction router system 128 may retrieve 414 the adjusted transaction record from the adjusted transaction record store 126. Subsequently, the smart transaction router system 128 may execute 416 the requested transaction based on the adjusted transaction record, in the manner detailed above. After executing the transactions, the smart transaction router system 128 updates 418 the executed transaction record history store 120 with the results of the executed transaction.

At the same time, the third party systems 108 send 420 data feed updates to the open transaction record store 114. These are updates to the open transactions and other data from the third party systems 108, which are stored locally at the open transaction record store 114, as described above. The transaction analyzer 124 retrieves 422 the open transactions from the open transaction record store 114, and further retrieves 424 the historical records, which include the executed open transactions from the executed transaction record history store 120 and the actual scores and other data computed for previously received open transactions, which may be stored in the open transaction record history store 116, or at the score database 210, or both. The transaction analyzer 124 computes new predicted scores or updated predicted scores based on the model for the predicted scores (e.g., the predicted score regression model 220), and uses these predicted scores to modify the reported unit counts from the open transaction record store 114 to generate the adjusted transaction record store 126, as detailed above.

Meanwhile, the smart transaction router system 128 receives 430 a second request to execute transactions, and executes 432 these transactions based on the updated adjusted transaction record.

Example Flow

Figure 5:
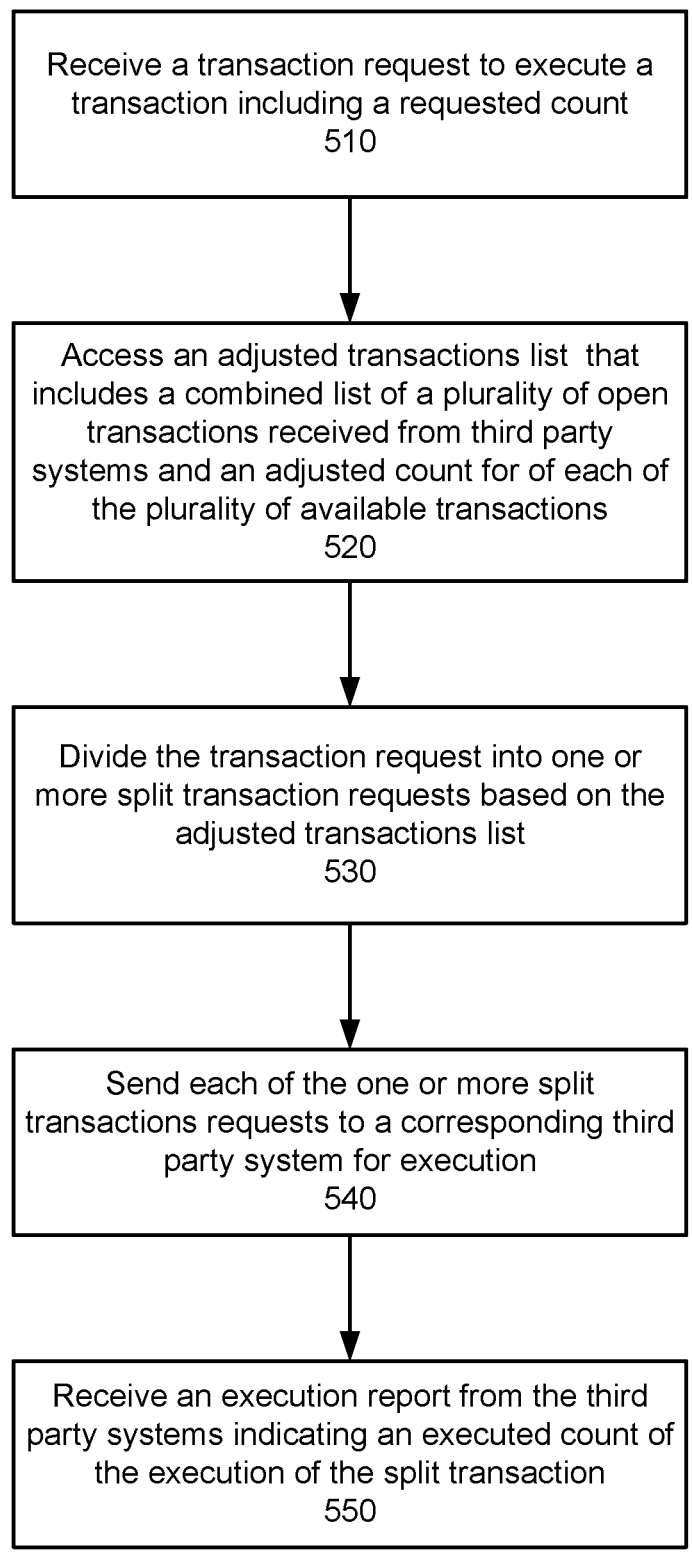
FIG. 5 is a flowchart illustrating an example process for adjusting transaction distribution based on predicted open transaction execution rates, in accordance with an embodiment.

FIG. 5 is a flowchart illustrating an example process for adjusting transaction distribution based on predicted open transaction execution rates, in accordance with an embodiment. In one embodiment, the illustrated operations are executed by the transaction processing system 130.

The transaction processing system 130 receives 510 a transaction request to execute a transaction including a requested count. This may be a request from a client device and may be an aggregate request. The request causes the transaction processing system 130 to initiate execution one or more open transactions as described above with various third party systems.

The transaction processing system 130 accesses 520 an adjusted transactions list that includes a combined list of a plurality of open transactions received from third party systems and an adjusted count for of each of the plurality of available transactions. The adjusted transactions list may be the adjusted transaction record store 126 which the transaction processing system 130 accesses to determine the adjusted unit counts prior to submitting the corresponding open transactions for execution. These adjusted unit counts are determined using a predictive model to generate predicted scores based on the differences between executed unit counts and reported unit counts of open transactions and executed transactions, as described previously.

The transaction processing system 130 divides 530 the transaction request into one or more split transaction requests based on the adjusted transactions list. The one or more split transactions are transactions that are routed by the transaction processing system 130 for the individual third party systems. Each requested unit count for each split transaction would have a requested unit count for an open transaction at a third party system that is less than or equal to the adjusted unit count for that open transaction.

The transaction processing system 130 sends 540 each of the one or more split transactions requests to a corresponding third party system for execution. After execution, each third party system responds with the results of the execution.

The transaction processing system 130 receives 550 an execution report from the third party systems indicating an executed count of the execution of the split transaction.

Example Blockchain Architecture

Figure 6A:
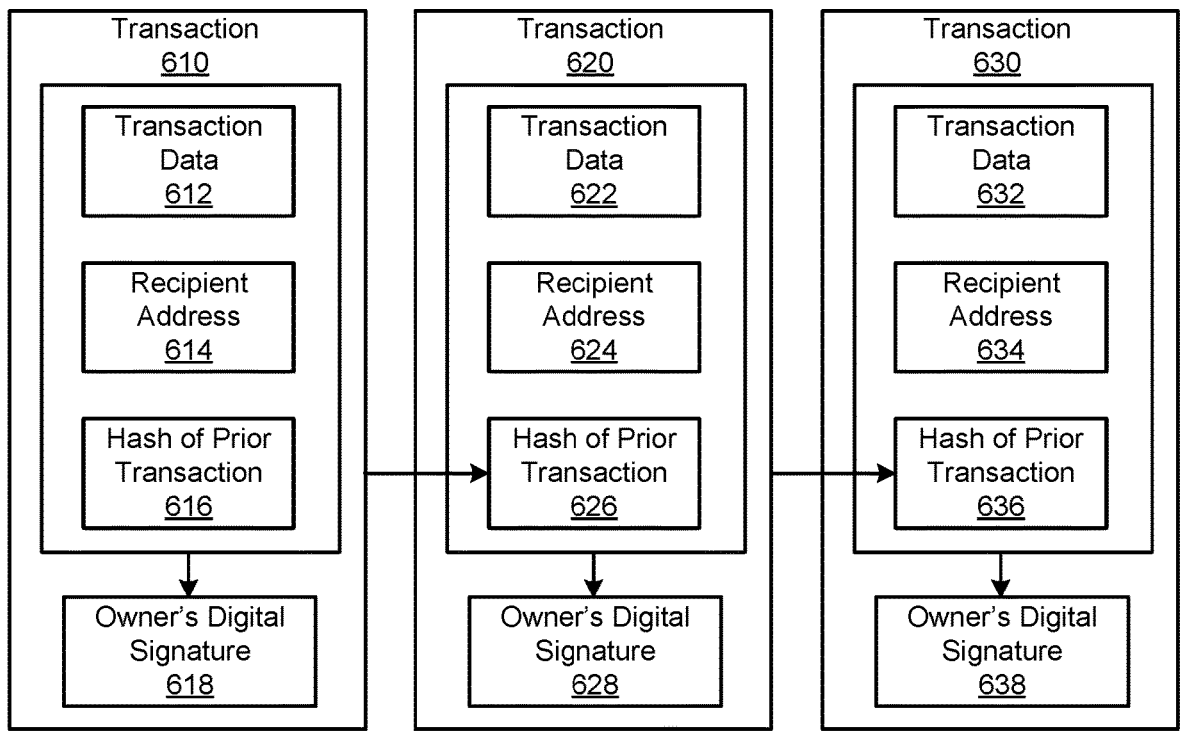
FIG. 6A is a block diagram illustrating a chain of transactions recorded on a blockchain that may be utilized in the system described in FIG. 1, in accordance with an embodiment.

FIG. 6A is a block diagram illustrating a chain of transactions broadcasted and recorded on a blockchain, in accordance with an embodiment. As noted above, the open transactions that are executed may involve different cryptocurrencies. A cryptocurrency is a currency that has a ledger that is stored in a decentralized blockchain. The blockchain records transactions that have occurred using the cryptocurrency in one or more blockchain units stored in the blockchain, but does not require a central authority to verify that the transactions are legitimate. Instead, the blockchain is generated via the cooperation of multiple nodes, or computing systems.

The distributed blockchain network may include a plurality of nodes. Each node is a user or a server that participates in the blockchain network. In a completely public blockchain, any participant may become a node of the blockchain. The nodes collectively may be used as a distributed computing system that serves as a virtual machine of the blockchain. In some embodiments, the virtual machine or a distributed computing system may be simply referred to as a computer. Any users of a public blockchain may broadcast transactions for the nodes of the blockchain to record. Each user's digital wallet is associated with a cryptographic private key that is used to sign transactions and prove the ownership of a blockchain unit.

The ownership of a blockchain unit may be traced through a chain of transactions. In FIG. 6A, a chain of transactions may include a first transaction 610, a second transaction 620, and a third transaction 630, etc. Each of the transactions in the chain may have a fairly similar structure. While each transaction is linked to a prior transaction in FIG. 6A, the transaction does not need to be recorded on consecutive blocks on the blockchain. For example, the block recording the transaction 610 and the block recording the transaction 620 may be separated by hundreds or even thousands of blocks. The traceback of the prior block is tracked by the hash of the prior block that is recorded by the current block.

Referring to one of the transactions in FIG. 6A, for illustration, the transaction 620 may be referred to as a current transaction. Transaction 610 may be a prior transaction and transaction 630 may be referred to a subsequent transaction. Each transaction includes a transaction data 622, a recipient address 624, a hash of the prior transaction 626, and the current transaction's owner's digital signature 628. The transaction data 622 records the substance of the current transaction 620. For example, the transaction data 622 may specify a transfer of a quantity of a blockchain unit (e.g., an electronic coin, a blockchain token, a BCDR, etc.). In some embodiments, the transaction data 622 may include code instructions of a smart contract.

The recipient address 624 is a version of the public key that corresponds to the private key of the digital wallet of the recipient. In one embodiment, the recipient address 624 is the public key itself. In another embodiment, the recipient address 624 an encoded version of the public key through one or more functions such as some deterministic functions. For example, the generation of the recipient address 624 from the public key may include hashing the public key, adding a checksum, adding one or more prefixes or suffixes, and encoding the resultant bits. The recipient address 624 may be a unique identifier of the digital wallet of the recipient on the blockchain.

The hash of the prior transaction 626 is the hash of the entire transaction data of the prior transaction 610. Likewise, the hash of the prior transaction 636 is the hash of the entire transaction data of the transaction 620. The hashing of the prior transaction 610 may be performed using a hashing algorithm such as a secure hash algorithm (SHA) or a message digest algorithm (MD). In some embodiments, the owner corresponding to the current transaction 620 may also use the public key of the owner to generate the hash. The hash of prior transaction 626 provides a traceback of the prior transaction 610 and also maintains the data integrity of the prior transaction 610.

In generating a current transaction 620, the digital wallet of the current owner of the blockchain unit uses its private key to encrypt the combination of the transaction data 622, the recipient address 624, and the hash of prior transaction 626 to generate the owner's digital signature 628. To generate the current transaction 620, the current owner specifies a recipient by including the recipient address 624 in the digital signature 628 of the current transaction 620. The subsequent owner of the blockchain unit is fixed by the recipient address 624. In other words, the subsequent owner that generates the digital signature 638 in the subsequent block 630 is fixed by the recipients address 624 specified by the current transaction 620. To verify the validity of the current transaction 620, any nodes in the blockchain network may trace back to the prior transaction 610 (by tracing the hash of prior transaction 626) and locate the recipient address 614. The recipient address 614 corresponds to the public key of the digital signature 628. Hence, the nodes in the blockchain network may use the public key to verify the digital signature 628.

The transfer of ownership of a blockchain unit may continue by the owner of the blockchain unit. To transfer the ownership, the owner may broadcast the transaction that includes the digital signature of the owner and a hash of the prior transaction. A valid transaction with a verifiable digital signature and a correct hash of the prior transaction will be recorded in a new block of the blockchain through the mining process.

Figure 6B:
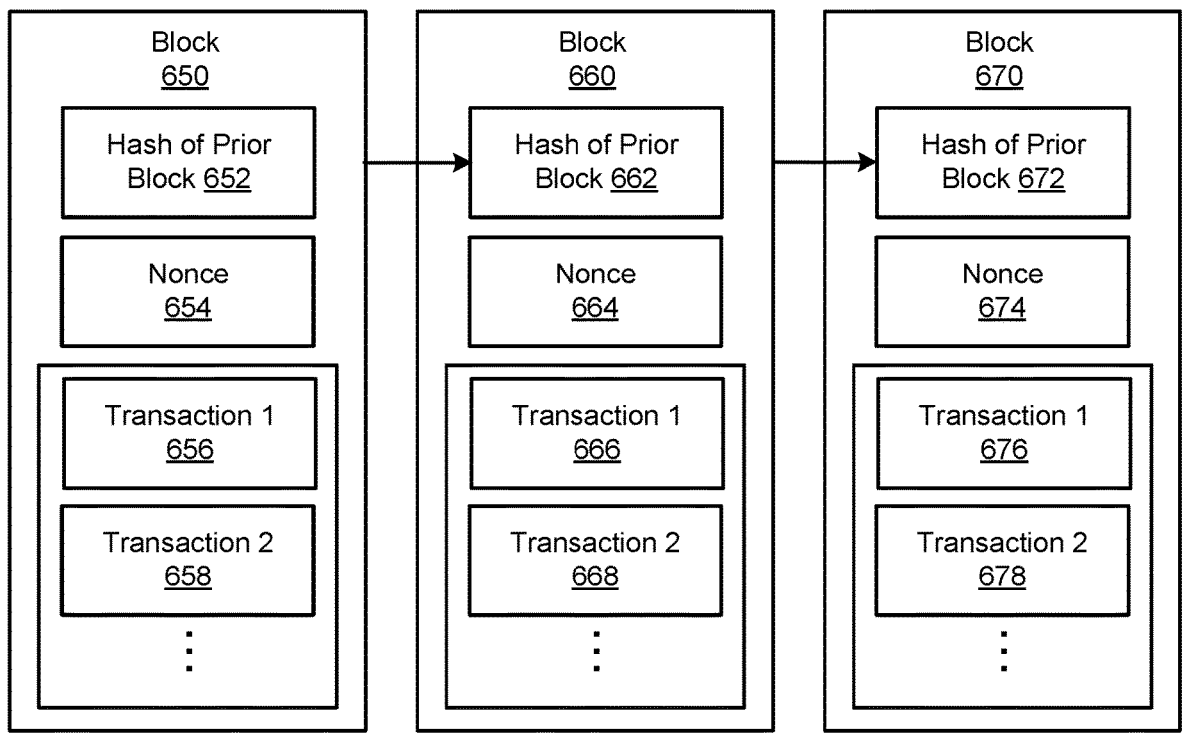
FIG. 6B is a block diagram illustrating a connection of multiple blocks in a blockchain that may be utilized in the system described in FIG. 1, in accordance with an embodiment.

FIG. 6B is a block diagram illustrating a connection of multiple blocks in a blockchain, in accordance with an embodiment. Each block of a blockchain, except the very first block which may be referred to as the genesis block, may have a similar structure. The blocks 650, 660, and 660 may each include a hash of the prior blockchain 652, a nonce 654, and a plurality of transactions (e.g., a first transaction 656, a second transaction 658, etc.). Each transaction may have the structure shown in FIG. 6A.

A new block may be generated through a mining process. For a public blockchain, any nodes in the blockchain system may participate in the mining process. The generation of the hash of the prior block may be conducted through a trial and error process. The entire data of the prior block (or a version of the prior block such as a simplified version) may be hashed using the nonce as a part of the input. The blockchain may require a certain format in the hash of prior block in order for the new block to be recognized by the nodes as valid. For example, in one embodiment, the hash of the prior block needs to start with a certain number of zeroes in the hash. Other criteria of the hash of the prior block may also be used, depending on the implementation of the blockchain.

By way of example, in generating the hash of prior block 662, a node which participates in the mining process may randomly combine a version of the prior block 650 with a random nonce (i.e., a random value) to generate a hash. The generated hash is somewhat a random number due to the random nonce. The node compares the generated hash with the criteria of the blockchain system to check if the criteria are met (e.g., whether the generated hash starts with a certain number of zeroes in the hash). If the generated hash fails to meet the criteria, the node tries a combination with another different random nonce to generate another hash. The process is repeated by different nodes in the blockchain network until one of the nodes find a hash that satisfies the criteria. The nonce that is used to generate the satisfactory hash is the nonce 664. The node that first generates the satisfactory hash 662 may also select what transactions that are broadcasted to the blockchain network is to be included in the block 660. The node may check the validity of the transaction (e.g., whether the transaction can be traced back to a prior recorded transaction and whether the digital signature of the generator of the transaction is valid). The selection may also depend on the number of broadcasted transactions that are pending to be recorded and also the fees that may be specified in the transactions. For example, in some embodiments, each transaction may be associated with a fee (e.g., a gas) for having the transaction recorded. After the transactions are selected and the data of the block 660 is fixed, the nodes in the blockchain network repeat the trial and error process to generate the hash of prior block 672 by trying different nonces.

In some cases different nodes may select different transactions to include in a subsequent blocks, and may compete with each other to find the proper nonce for that set of transactions that has a generated hash that satisfies the criteria. Therefore, there may be a situation where multiple satisfactory hashes are generated for blocks that contain different transactions. This creates a fork in the blockchain. Future blocks may be hashed based on the data in either block of this fork. However, in practice, in order to avoid adding blocks to multiple forks, the nodes may reach consensus by selecting the fork that has the block with an earlier timestamp, or use some other criteria, in order to select the primary fork from which to hash further blocks. In other embodiments, instead of computing a nonce, which may be computationally expensive, the nodes may use other consensus methods, such as proof of stake methods, to determine which fork to follow.

New blocks may be continued to be generated through the mining process. A transaction of a blockchain unit (e.g., an electronic coin, a blockchain token, a BCDR, etc.) is complete when the broadcasted transaction is recorded in a block. In some embodiment, the transaction is considered settled when the transaction is multi-verified. A transaction is multi-verified when there are multiple subsequent blocks generated and linked to the block that records the transaction.

In some embodiments, some of the transactions 656, 658, 666, 668, 676, 678, etc. may include one or more smart contracts. The code instructions of the smart contracts are recorded may be recorded in the block and are often immutable. When conditions are met, the code instructions of the smart contract are triggered. The code instructions may cause a computer (e.g., a virtual machine of the blockchain) to carry out some actions such as generating a blockchain unit and broadcasting a transaction documenting the generation to the blockchain network for recordation.

Computing Machine Architecture

Figure 7:
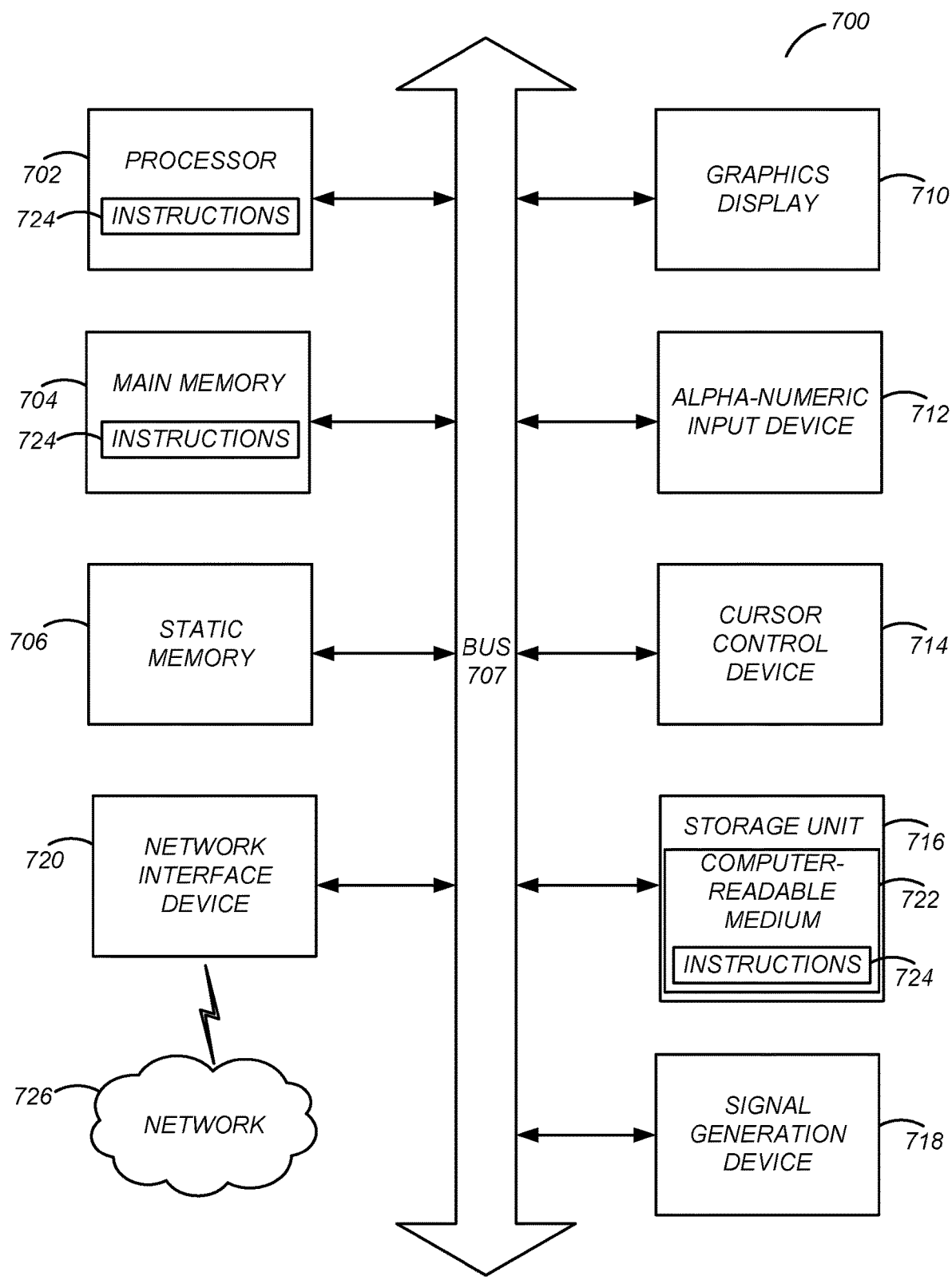
FIG. 7 is a block diagram illustrating an example computing device, in accordance with an embodiment.

FIG. 7 is a block diagram illustrating components of an example computing machine that is capable of reading instructions from a computer-readable medium and execute them in a processor (or controller). A computer described herein may include a single computing machine shown in FIG. 7, a virtual machine, a distributed computing system that includes multiples nodes of computing machines shown in FIG. 7, or any other suitable arrangement of computing devices. The computer described herein may be used by any of the elements described in the previous figures to execute the described functions.

By way of example, FIG. 7 shows a diagrammatic representation of a computing machine in the example form of a computer system 700 within which instructions 724 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 7 may correspond to any software, hardware, or combined components shown in the above figures. While FIG. 7 shows various hardware and software elements, each of the components described in the above figures may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 724 that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processors (generally, processor 702) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alpha-numeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a computer-readable medium 722 on which is stored instructions 724 embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting computer-readable media. The instructions 724 may be transmitted or received over a network 726 via the network interface device 720.

While computer-readable medium 722 is shown in an example embodiment to be a single medium, the term "computer-readable medium" should be taken to include a single medium or multiple media (e.g., a centralized or distributed database, or associated caches and servers) able to store instructions (e.g., instructions 724). The computer-readable medium may include any medium that is capable of storing instructions (e.g., instructions 724) for execution by the machine and that cause the machine to perform any one or more of the methodologies disclosed herein. The computer-readable medium may include, but not be limited to, data repositories in the form of solid-state memories, optical media, and magnetic media. The computer-readable medium does not include a transitory medium such as a signal or a carrier wave.

Additional Configuration Considerations

Certain embodiments are described herein as including logic or a number of components, engines, modules, or mechanisms. Engines may constitute either software modules (e.g., code embodied on a computer-readable medium) or hardware modules. A hardware engine is a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or another programmable processor) that is temporarily configured by software to perform certain operations. It will be appreciated that the decision to implement a hardware engine mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a similar system or process through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A system comprising:
   a transaction processing system configured to:
   receive a transaction request to execute a transaction at one or more of a plurality of third party systems, the transaction request including a requested unit count;
   access an adjusted transaction record storing a plurality of open transactions received from the plurality of third party systems, each of the plurality of open transactions storing an adjusted unit count for of the open transactions, the adjusted available transactions list generated by:
      computing the adjusted unit count for each of the plurality of open transactions of each third party system by modifying a reported unit count of each open transaction using a predicted score generated from a predictive model, the predictive model generating the predicted score based on differences between reported unit counts of prior executed open transactions and executed unit counts of the executed open transactions; and
   divide the transaction request into one or more split transaction requests, each split transaction request associated with an open transaction of the plurality of open transactions in the adjusted transaction record, a requested unit count of each split transaction not exceeding an adjusted unit count of the open transaction associated with each split transaction, and wherein each split transaction request corresponds to one of the plurality of third party systems which provided the open transaction associated with each split transaction; and
   send each of the one or more split transactions requests to a corresponding third party system for execution, wherein the corresponding third party system executes the open transaction corresponding to each split transaction at the requested unit count of each split transaction.

2. The system of claim 1, wherein the transaction processing system is further configured to:
   receive an execution report from one or more of the plurality of third party systems indicating an executed unit count of the execution of the open transaction corresponding to each split transaction of the one or more split transactions.

3. The system of claim 2, wherein the predictive model is further generated by:
   determining, for each of a plurality of executed open transactions, whether the executed unit count of the executed open transaction is greater than, less than, or equal to the reported unit count of the executed open transaction;
   in response to the executed unit count of the executed open transaction being greater than the reported unit count of the executed open transaction, generating a positive actual score for the executed open transaction;
   in response to the executed unit count of the executed open transaction being less than the reported unit count of the executed open transaction, generating a negative actual score for the executed open transaction;
   in response to the executed unit count of the executed open transaction being equal to the reported unit count of the executed open transaction, generating an actual score of zero for the executed open transaction; and
   generating the predictive model based on the generated actual scores for the plurality of executed open transactions.

4. The system of claim 3, wherein the actual score for each executed open transaction is generated by:
   determining a first result being a minimum of the reported unit count of the executed open transaction and a requested unit count of the executed open transaction subtracted by 1;
   determining a second result being a ratio between the executed unit count and the first result; and
   determining the actual score as the minimum between 1 and the second result.

5. The system of claim 3, wherein an open transaction requested for execution that is not executed is given an executed unit count of zero.

6. The system of claim 3, wherein an executed unit count of an unlisted open transaction that is executed at a third party system is added to an executed unit count of a listed open transaction having the closest value amount to the unlisted open transaction, the unlisted open transaction being an open transaction that is executed at a third party system and which is not listed in the adjusted transaction record, the listed open transaction being an open transaction that is executed at the third party system and which is listed in the adjusted transaction record.

7. The system of claim 3, wherein the predictive model is further generated by:
   generating a regression model, the inputs to the regression model being sampled actual scores from a plurality of buckets, each bucket including actual scores of executed open transactions from a third party system with an execution timestamp within a range of recency for that bucket, the regression model generating the predicted score that indicates a likely value for an actual score for an open transaction.

8. The system of claim 7, wherein actual scores are sampled from one hour intervals within the range of recency for each bucket.

9. The system of claim 1, wherein modifying a reported unit count of each open transaction further comprises:
   incrementing the predicted score generated for the open transaction by one; and
   multiplying the reported unit count for the open transaction by the incremented predicted score to generate the adjusted unit count for the open transaction.

10. The system of claim 1, wherein the transaction processing system divides the transaction request into the one or more split transaction requests by selecting one or more open transactions from the adjusted transaction record with a highest ranking of the plurality of open transactions in the adjusted transaction record, the sum of the reported unit counts of the selected one or more open transactions greater than or equal to the requested unit count of the transaction request, the plurality of open transactions in the adjusted transaction record ranked according to a value amount of each open transaction in the adjusted transaction record.

11. A method, comprising:
   receiving a transaction request to execute a transaction at one or more of a plurality of third party systems, the transaction request including a requested unit count;
   accessing an adjusted transaction record storing a plurality of open transactions received from the plurality of third party systems, each of the plurality of open transactions storing an adjusted unit count for of the open transactions, the adjusted available transactions list generated by:
      computing the adjusted unit count for each of the plurality of open transactions of each third party system by modifying a reported unit count of each open transaction using a predicted score generated from a predictive model, the predictive model generating the predicted score based on differences between reported unit counts of prior executed open transactions and executed unit counts of the executed open transactions; and
   dividing the transaction request into one or more split transaction requests, each split transaction request associated with an open transaction of the plurality of open transactions in the adjusted transaction record, a requested unit count of each split transaction not exceeding an adjusted unit count of the open transaction associated with each split transaction, and wherein each split transaction request corresponds to one of the plurality of third party systems which provided the open transaction associated with each split transaction;
   sending each of the one or more split transactions requests to a corresponding third party system for execution, wherein the corresponding third party system executes the open transaction corresponding to each split transaction at the requested unit count of each split transaction.

12. The method of claim 11, further comprising:
   receiving an execution report from one or more of the plurality of third party systems indicating an executed unit count of the execution of the open transaction corresponding to each split transaction of the one or more split transactions.

13. The method of claim 12, wherein the predictive model is further generated by:
   determining, for each of a plurality of executed open transactions, whether the executed unit count of the executed open transaction is greater than, less than, or equal to the reported unit count of the executed open transaction;
   in response to the executed unit count of the executed open transaction being greater than the reported unit count of the executed open transaction, generating a positive actual score for the executed open transaction;
   in response to the executed unit count of the executed open transaction being less than the reported unit count of the executed open transaction, generating a negative actual score for the executed open transaction;
   in response to the executed unit count of the executed open transaction being equal to the reported unit count of the executed open transaction, generating an actual score of zero for the executed open transaction; and
   generating the predictive model based on the generated actual scores for the plurality of executed open transactions.

14. The method of claim 13, wherein the actual score for each executed open transaction is generated by:
   determining a first result being a minimum of the reported unit count of the executed open transaction and a requested unit count of the executed open transaction subtracted by 1;
   determining a second result being a ratio between the executed unit count and the first result; and
   determining the actual score as the minimum between 1 and the second result.

15. The method of claim 13, wherein an open transaction requested for execution that is not executed is given an executed unit count of zero.

16. The method of claim 13, wherein an executed unit count of an unlisted open transaction that is executed at a third party system is added to an executed unit count of a listed open transaction having the closest value amount to the unlisted open transaction, the unlisted open transaction being an open transaction that is executed at a third party system and which is not listed in the adjusted transaction record, the listed open transaction being an open transaction that is executed at the third party system and which is listed in the adjusted transaction record.

17. The method of claim 13, wherein the predictive model is further generated by:
   generating a regression model, the inputs to the regression model being sampled actual scores from a plurality of buckets, each bucket including actual scores of executed open transactions from a third party system with an execution timestamp within a range of recency for that bucket, the regression model generating the predicted score that indicates a likely value for an actual score for an open transaction.

18. The method of claim 17, wherein the plurality of buckets include buckets with ranges of recency within an hour, day, week, and month of a current timestamp.

19. The method of claim 11, wherein modifying a reported unit count of each open transaction further comprises:
   incrementing the predicted score generated for the open transaction by one; and
   multiplying the reported unit count for the open transaction by the incremented predicted score to generate the adjusted unit count for the open transaction.

20. The method of claim 11, wherein the transaction processing system divides the transaction request into the one or more split transaction requests by selecting one or more open transactions from the adjusted transaction record with a highest ranking of the plurality of open transactions in the adjusted transaction record, the sum of the reported unit counts of the selected one or more open transactions greater than or equal to the requested unit count of the transaction request, the plurality of open transactions in the adjusted transaction record ranked according to a value amount of each open transaction in the adjusted transaction record.

* * * * *

UNITED STATES PATENT AND TRADEMARK OFFICE
CERTIFICATE OF CORRECTION

PATENT NO. : 11,042,849 B2
APPLICATION NO. : 16/508192
DATED : June 22, 2021
INVENTOR(S) : Ashu Swami et al.

Page 1 of 1

It is certified that error appears in the above-identified patent and that said Letters Patent is hereby corrected as shown below:

In the Claims

Column 25, Claim 1, Line 48        delete "of"

Column 27, Claim 11, Line 34       delete "of"

Signed and Sealed this
Second Day of August, 2022

Katherine Kelly Vidal
*Director of the United States Patent and Trademark Office*